(12) United States Patent
Gundavelli et al.

(10) Patent No.: US 10,455,403 B2
(45) Date of Patent: *Oct. 22, 2019

(54) VIRTUAL MOBILITY ANCHOR FOR NETWORK SHARING

(71) Applicant: Cisco Technology, Inc., San Jose, CA (US)

(72) Inventors: Srinath Gundavelli, San Jose, CA (US); Vojislav Vucetic, Holmdel, NJ (US); Kent K. Leung, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/984,997

(22) Filed: May 21, 2018

(65) Prior Publication Data

US 2018/0270646 A1  Sep. 20, 2018

Related U.S. Application Data

(63) Continuation of application No. 14/981,585, filed on Dec. 28, 2015, now Pat. No. 10,009,751.

(51) Int. Cl.
*H04W 8/04* (2009.01)
*H04W 48/16* (2009.01)
(Continued)

(52) U.S. Cl.
CPC .............. *H04W 8/04* (2013.01); *H04W 8/02* (2013.01); *H04W 8/08* (2013.01); *H04W 8/18* (2013.01);
(Continued)

(58) Field of Classification Search
CPC ....... H04W 12/06; H04W 48/16; H04W 8/04; H04W 8/08; H04W 8/18; H04W 8/02; H04W 8/26
See application file for complete search history.

(56) References Cited

U.S. PATENT DOCUMENTS 8,213,934 B2 * 7/2012 Tsirtsis ................. H04W 8/04
370/395.52
8,634,821 B2 * 1/2014 Raleigh ............ H04L 41/0806
455/419
(Continued)

OTHER PUBLICATIONS

3GPP TS 29.272 V13.4.0 (Dec. 2015) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 13)/ 3GPP, 650 Route des Lucioles, Sophia Antipolis Valbonne—France; Dec. 2015, 150 pages.

*Primary Examiner* — Babar Sarwar
(74) *Attorney, Agent, or Firm* — Patterson + Sheridan, LLP

(57) ABSTRACT

Embodiments are directed to a virtual mobility anchor network element to receive, from a packet gateway (PGW) node, a request for an internet protocol (IP) address for a mobile device, establish an IP address for the mobile device; and provide the IP address to the PGW node in response to the request for the IP address for the mobile device. The virtual mobility anchor network element is configured to receive IP traffic from a network location; determine a target destination for the IP traffic based on a destination IP address, the destination IP address comprising the second IP address; and forward the IP traffic to the PGW node associated with the destination IP address. The virtual mobility anchor network element is also configured to receive IP traffic from the PGW node; determine a target destination for the IP traffic; and route the IP traffic to the target destination.

23 Claims, 11 Drawing Sheets

(51) Int. Cl.
*H04W 12/06* (2009.01)
*H04W 8/08* (2009.01)
*H04W 8/18* (2009.01)
*H04W 8/02* (2009.01)
*H04W 8/26* (2009.01)

(52) U.S. Cl.
CPC .......... *H04W 12/06* (2013.01); *H04W 48/16* (2013.01); *H04W 8/26* (2013.01)

(56) References Cited

U.S. PATENT DOCUMENTS

| | | | |
|---|---|---|---|
| 9,686,813 B2* | 6/2017 | Bhatnagar | H04W 76/025 |
| 2003/0148777 A1* | 8/2003 | Watanabe | H04W 68/04 |
| | | | 455/458 |
| 2007/0297581 A1* | 12/2007 | Kuo | H04L 12/66 |
| | | | 379/93.26 |
| 2010/0088751 A1* | 4/2010 | Ando | H04W 8/065 |
| | | | 726/5 |
| 2012/0084449 A1* | 4/2012 | Delos Reyes | H04L 61/1511 |
| | | | 709/229 |
| 2014/0044098 A1* | 2/2014 | Roeland | H04W 36/22 |
| | | | 370/331 |
| 2014/0219248 A1* | 8/2014 | Reddiboyana | H04W 76/025 |
| | | | 370/331 |
| 2015/0163365 A1* | 6/2015 | Qiu | H04M 15/41 |
| | | | 370/259 |
| 2015/0304892 A1* | 10/2015 | Perras | H04L 61/2007 |
| | | | 370/331 |
| 2016/0192240 A1* | 6/2016 | Duan | H04W 48/18 |
| | | | 370/230 |
| 2017/0093749 A1* | 3/2017 | Hoffmann | G06F 9/5077 |
| 2017/0188223 A1 | 6/2017 | Gundavelli et al. | |
| 2017/0201922 A1* | 7/2017 | Akiyoshi | H04W 36/12 |

\* cited by examiner

VIRTUAL MOBILITY ANCHOR FOR NETWORK SHARING

CROSS-REFERENCE TO RELATED APPLICATIONS

This application is a continuation of co-pending U.S. patent application Ser. No. 14/981,585, filed Dec. 28, 2015. The aforementioned related patent application is herein incorporated by reference in its entirety.

TECHNICAL FIELD

This disclosure pertains to a virtual mobility anchor for network sharing, and more particularly a virtual mobility anchor for Long Term Evolution network sharing.

BACKGROUND

In network sharing, each operator has its own core-network, while the radio network (eNB) is shared. In some cases, the mobility management entity (MME) is also a shared resource. Owning and managing a core network requires expertise and comes with significant capital and operational cost. Typically, a Mobile Virtual Network Operator (MVNO) leases access to core network elements owned by a Mobile Network Operator (MNO).

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DETAILED DESCRIPTION

Figure 1:
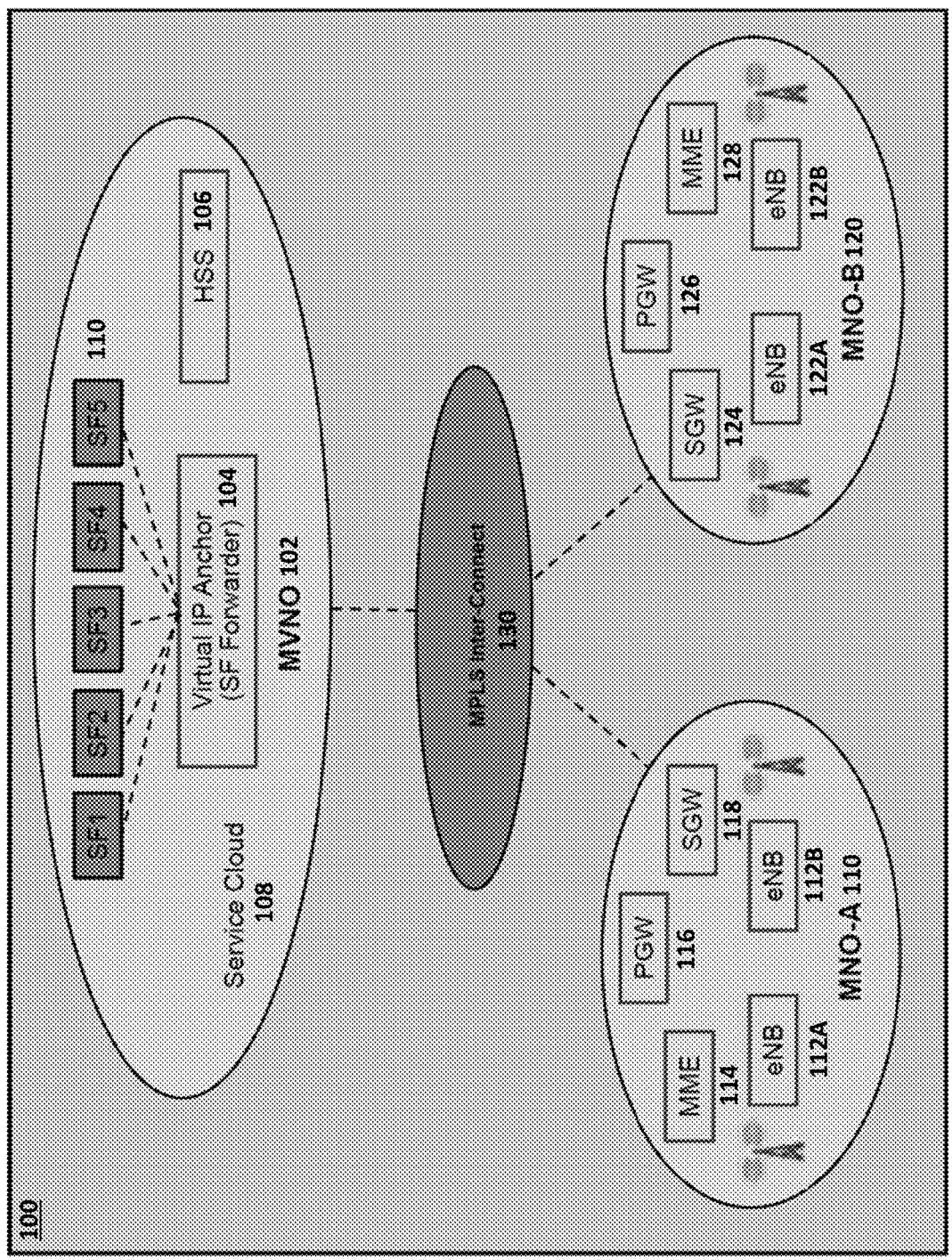
FIG. 1 is a schematic block diagram of a wireless network that includes a virtual mobility anchor node in accordance with embodiments of the present disclosure.

Network sharing can require each operator to have its own core network (i.e., set of network elements, such as packet gateway (PGW), serving gateway (SGW), mobility management entity (MME), Policy and Charging Rules Function (PCRF), home subscriber server (HSS), etc.), while the radio network (e.g., base station, etc.) is shared between operators.

This disclosure describes a new network-sharing scheme that does not require a Mobile Virtual Network Operator (MVNO) to manage a complex set of network functions. Rather, the MVNO can host and manage standard IP-based cloud services that can meet the MVNO's business and architectural objectives.

In embodiments, a MVNO can leverage both the radio and core network from the Mobile Network Operator (MNO) partners, eliminating the costs involved in the core network management, but still retaining control on mobility and IP anchoring of the subscriber sessions. The goal and purpose of this effort is to facilitate MVNO deployments based on standard IP cloud-based architectures and overlay models.

Aspects of the embodiments are directed to a virtual mobility anchor network element. The virtual mobility anchor network element includes a network interface implemented at least partially in hardware and a processor implemented at least in hardware. The virtual mobility anchor network element is configured to establish an IP address for the mobile device and provide the IP address to a packet gateway (PGW) node of a mobile network operator (MNO) in response to the request for the IP address for the mobile device.

In some implementations of the embodiments, the request for an IP address comprises a Dynamic Host Configuration Protocol (DHCP) request message from the PGW node. In some implementations of the embodiments, the DHCP request for an IP address received from the PGW node comprises one or both of an International Mobile Subscriber Identity (IMSI) or a Network Access Identifier (NAI).

In some implementations of the embodiments, the virtual mobility anchor network element is further configured to receive IP traffic from a network location; determine a target destination for the IP traffic based on a destination IP address of the mobile device; and forward the IP traffic to a PGW node associated with the destination IP address of the mobile device.

In some implementations of the embodiments, the virtual mobility anchor network element is further configured to receive IP traffic from the PGW node; determine a target destination for the IP traffic; and route the IP traffic to the target destination.

In some implementations of the embodiments, the MNO is a first MNO, the IP address is a first IP address and the PGW node is a first PGW node of the first MNO. The network interface is configured to receive, from a second PGW node of a second MNO, a second request for an IP address for the mobile device. The virtual mobility anchor network element is configured to provide the first IP address to the second PGW in response to the second request for an IP address for the mobile device. In some implementations of the embodiments, the second request comprises a Dynamic Host Configuration Protocol request message.

In some implementations of the embodiments, the first PGW node is associated with a first core network of the first MNO and the second PGW node is associated with a second core network of the second MNO.

In some implementations of the embodiments, the virtual mobility anchor network element is configured to instruct the first PGW node to forget and release the first IP address and to discontinue routing IP traffic to the virtual mobility anchor network element.

In some implementations of the embodiments, the virtual mobility anchor network element is configured to receive IP traffic from a network location; determine a target destination for the IP traffic based on a destination IP address, the destination IP address comprising the second IP address; and forward the IP traffic to the second PGW node associated with the destination IP address.

In some implementations of the embodiments, the virtual mobility anchor network element is further configured to receive IP traffic from the second PGW node; determine a target destination for the IP traffic; and route the IP traffic to the target destination.

In some implementations of the embodiments, the IP address is a first IP address. The network interface is configured to receive, from a wireless access gateway (WAG) node associated with a wireless local area network (WLAN), a second request for an IP address for the mobile device. The virtual mobility anchor network element is configured to provide the first IP address to the WAG node in response to the second request for an IP address for the mobile device. In some implementations of the embodiments, the second request for an IP address comprises a Dynamic Host Configuration Protocol request message.

In some implementations of the embodiments, the virtual mobility anchor network element is configured to instruct the PGW node to forget and release the first IP address and to discontinue routing IP traffic to the virtual mobility anchor network element.

In some implementations of the embodiments, the virtual mobility anchor network element is configured to receive IP traffic from a network location; determine a target destination for the IP traffic based on a destination IP address, the destination IP address comprising the second IP address; and forward the IP traffic to the WAG node associated with the destination IP address.

In some implementations of the embodiments, the virtual mobility anchor network element is further configured to receive IP traffic from the mobile device associated with the WAG node; determine a target destination for the IP traffic; and route the IP traffic to the target destination.

In some implementations of the embodiments, the IP address is a first IP address. The network interface is configured to receive, from an IP security gateway (IPsec GW) node associated with a wireless local area network (WLAN), a request for an IP address for the mobile device. The virtual mobility anchor network element is configured to provide the first IP address to the IPsec GW node in response to the request for an IP address for the mobile device. In some implementations of the embodiments, the request comprises a Dynamic Host Configuration Protocol request message.

In some implementations of the embodiments, the virtual mobility anchor network element is configured to instruct the PGW node to forget and release the first IP address and to discontinue routing IP traffic to the virtual mobility anchor network element.

In some implementations of the embodiments, the virtual mobility anchor network element is configured to receive IP traffic from a network location, determine a target destination for the IP traffic based on a destination IP address, the destination IP address comprising the second IP address, and forward the IP traffic to the IPsec GW node associated with the destination IP address.

In some implementations of the embodiments, the virtual mobility anchor network element is further configured to receive IP traffic from the IPsec GW node; determine a target destination for the IP traffic; and route the IP traffic to the target destination.

In some implementations of the embodiments, the virtual mobility anchor network node is associated with a Mobile Virtual Network Operator.

In some implementations of the embodiments, the virtual mobility anchor network element is further configured to perform classification of incoming IP traffic and apply service functions to each packet of the incoming IP traffic.

Aspects of the embodiments are directed to a method performed by a virtual mobility anchor network element implemented at least partially in hardware. The method includes receiving, from a packet gateway (PGW) node, a request for an internet protocol (IP) address for a mobile device; and establishing an IP address for the mobile device. The method also includes providing the IP address to the PGW node in response to the request for the IP address for the mobile device.

In some implementations of the embodiments, the request for an IP address comprises a Dynamic Host Configuration Protocol (DHCP) request.

In some implementations of the embodiments, the request for an IP address received from the PGW node comprises one or both of an International Mobile Subscriber Identity (IMSI) or a Network Access Identifier (NAI).

In some implementations of the embodiments, the method also includes receiving IP traffic from a network location; determining a target destination for the IP traffic based on a destination IP address; and forwarding the IP traffic to a PGW node associated with the destination IP address.

In some implementations of the embodiments, the method also include receiving IP traffic from the PGW node; determining a target destination for the IP traffic; and routing the IP traffic to the target destination.

In some implementations of the embodiments, the IP address is a first IP address and the PGW node is a first PGW node. The method also includes receiving, from a second PGW node, a request for an IP address for the mobile device; and providing the first IP address to the second PGW in response to the request for an IP address for the mobile device.

In some implementations of the embodiments, the first PGW node is associated with a first core network and the second PGW node is associated with a second core network, the first core network different from the second core network.

In some implementations of the embodiments, the method also includes instructing the first PGW node to forget the first IP address and to discontinue routing IP traffic to the virtual mobility anchor network element.

In some implementations of the embodiments, the method also includes receiving IP traffic from a network location; determining a target destination for the IP traffic based on a destination IP address, the destination IP address comprising the second IP address; and forwarding the IP traffic to the second PGW node associated with the destination IP address.

In some implementations of the embodiments, the method also includes receiving IP traffic from the second PGW node;

determining a target destination for the IP traffic; and routing the IP traffic to the target destination.

In some implementations of the embodiments, the IP address is a first IP address. The method also includes receiving, from a wireless access gateway (WAG) node associated with a wireless local area network (WLAN), a request for an IP address for the mobile device; and providing the first IP address to the WAG node in response to the request for an IP address for the mobile device.

In some implementations of the embodiments, the method also includes instructing the PGW node to forget the first IP address and to discontinue routing IP traffic to the virtual mobility anchor network element.

In some implementations of the embodiments, the method also includes receiving IP traffic from a network location; determining a target destination for the IP traffic based on a destination IP address, the destination IP address comprising the second IP address; and forwarding the IP traffic to the WAG node associated with the destination IP address.

In some implementations of the embodiments, the method also includes receive IP traffic from the WAG node; determine a target destination for the IP traffic; and route the IP traffic to the target destination.

In some implementations of the embodiments, the IP address is a first IP address. The method also includes receiving, from an IP security gateway (IPsec GW) node associated with a wireless local area network (WLAN), a request for an IP address for the mobile device; and providing the first IP address to the IPsec GW node in response to the request for an IP address for the mobile device.

In some implementations of the embodiments, the method also includes instructing the PGW node to forget the first IP address and to discontinue routing IP traffic to the virtual mobility anchor network element.

In some implementations of the embodiments, the method also includes receiving IP traffic from a network location; determining a target destination for the IP traffic based on a destination IP address, the destination IP address comprising the second IP address; and forwarding the IP traffic to the IPsec GW node associated with the destination IP address.

In some implementations of the embodiments, the method also includes receiving IP traffic from the IPsec GW node; determining a target destination for the IP traffic; and routing the IP traffic to the target destination.

In some implementations of the embodiments, the virtual mobility anchor network node is associated with a Mobile Virtual Network Operator.

In some implementations of the embodiments, the method also including performing classification of incoming IP traffic and applying service functions to each packet of the incoming IP traffic.

Aspects of the embodiments are directed to a computer-readable non-transitory medium comprising one or more instructions for augmenting metadata of a network service header, that when executed on a processor configure the processor to receive, from a packet gateway (PGW) node, a request for an internet protocol (IP) address for a mobile device; and establish an IP address for the mobile device; and provide the IP address to the PGW node in response to the request for the IP address for the mobile device.

In some implementations of the embodiments, the request for an IP address comprises a Dynamic Host Configuration Protocol (DHCP) request.

In some implementations of the embodiments, the request for an IP address received from the PGW node comprises one or both of an International Mobile Subscriber Identity (IMSI) or a Network Access Identifier (NAI).

In some implementations of the embodiments, the instructions cause the processor to receive IP traffic from a network location; determine a target destination for the IP traffic based on a destination IP address; and forward the IP traffic to a PGW node associated with the destination IP address.

In some implementations of the embodiments, the instructions cause the processor to receive IP traffic from the PGW node; determine a target destination for the IP traffic; and route the IP traffic to the target destination.

In some implementations of the embodiments, the IP address is a first IP address and the PGW node is a first PGW node; and wherein the instructions cause the processor to receive, from a second PGW node, a request for an IP address for the mobile device; and provide the first IP address to the second PGW in response to the request for an IP address for the mobile device.

In some implementations of the embodiments, the first PGW node is associated with a first core network and the second PGW node is associated with a second core network, the first core network different from the second core network.

In some implementations of the embodiments, the instructions cause the processor to instruct the first PGW node to forget the first IP address and to discontinue routing IP traffic to the virtual mobility anchor network element.

In some implementations of the embodiments, the instructions cause the processor to receive IP traffic from a network location; determine a target destination for the IP traffic based on a destination IP address, the destination IP address comprising the second IP address; and forward the IP traffic to the second PGW node associated with the destination IP address.

In some implementations of the embodiments, the instructions cause the processor to receive IP traffic from the second PGW node; determine a target destination for the IP traffic; and route the IP traffic to the target destination.

In some implementations of the embodiments, the IP address is a first IP address; and wherein the instructions cause the processor to receive, from a wireless access gateway (WAG) node associated with a wireless local area network (WLAN), a request for an IP address for the mobile device; and provide the first IP address to the WAG node in response to the request for an IP address for the mobile device.

In some implementations of the embodiments, the virtual mobility anchor network element is configured to instruct the PGW node to forget the first IP address and to discontinue routing IP traffic to the virtual mobility anchor network element.

In some implementations of the embodiments, the instructions cause the processor to receive IP traffic from a network location; determine a target destination for the IP traffic based on a destination IP address, the destination IP address comprising the second IP address; and forward the IP traffic to the WAG node associated with the destination IP address.

In some implementations of the embodiments, the instructions cause the processor to receive IP traffic from the WAG node; determine a target destination for the IP traffic; and route the IP traffic to the target destination.

In some implementations of the embodiments, the IP address is a first IP address; and wherein the instructions cause the processor to receive, from an IP security gateway (IPsec GW) node associated with a wireless local area network (WLAN), a request for an IP address for the mobile device; and provide the first IP address to the IPsec GW node in response to the request for an IP address for the mobile device.

In some implementations of the embodiments, the instructions cause the processor to instruct the PGW node to forget the first IP address and to discontinue routing IP traffic to the virtual mobility anchor network element.

In some implementations of the embodiments, the instructions cause the processor to receive IP traffic from a network location; determine a target destination for the IP traffic based on a destination IP address, the destination IP address comprising the second IP address; and forward the IP traffic to the IPsec GW node associated with the destination IP address.

In some implementations of the embodiments, the instructions cause the processor to receive IP traffic from the IPsec GW node; determine a target destination for the IP traffic; and route the IP traffic to the target destination.

In some implementations of the embodiments, the virtual mobility anchor network node is associated with a Mobile Virtual Network Operator.

In some implementations of the embodiments, the instructions cause the processor to perform classification of incoming IP traffic and apply service functions to each packet of the incoming IP traffic.

Aspects of the embodiments are directed to an Internet gateway node implemented at least partially in hardware, the Internet gateway node associated with a mobile network operator (MNO), the Internet gateway node including a network interface implemented at least partially in hardware; and a processor implemented at least partially in hardware. The Internet gateway node is configured to send a request for an Internet Protocol (IP) address to a virtual mobility anchor node associated with a mobile virtual network operator (MVNO) for a user equipment (UE); receive an IP address from the virtual mobility anchor node; and allocate the IP address to the UE.

In some implementations of the embodiments, the Internet gateway node is configured to receive IP traffic from the UE; and forward the IP traffic to the virtual mobility anchor node.

In some implementations of the embodiments, Internet gateway node is configured to receive IP traffic from the virtual mobility anchor node destined for the UE; and forward the IP traffic to the UE.

In some implementations of the embodiments, the Internet gateway node aos includes one of a packet gateway (PGW), a Wireless Access Gateway (WAG), or an IP Security Gateway (IPsec GW). In some implementations of the embodiments, the PGW is configured to operate in local breakout mode (LBO).

In some implementations of the embodiments, the request comprises a Dynamic Host Configuration Protocol (DHCP) request.

Aspects of the embodiments are directed to a method performed on an Internet gateway node implemented at least partially in hardware, the Internet gateway node associated with a mobile network operator (MNO). The method includes sending a Dynamic Host Configuration Protocol (DHCP) request for an Internet Protocol (IP) address to a virtual mobility anchor node associated with a mobile virtual network operator (MVNO) for a user equipment (UE); receiving an IP address from the virtual mobility anchor node; and allocating the IP address to the UE.

In some implementations of the embodiments, the method also includes receiving IP traffic from the UE; and forwarding the IP traffic to the virtual mobility anchor node.

In some implementations of the embodiments, the method also includes receiving IP traffic from the virtual mobility anchor node destined for the UE; and forwarding the IP traffic to the UE.

In some implementations of the embodiments, the Internet gateway node comprises one of a packet gateway (PGW), a Wireless Access Gateway (WAG), or an IP Security Gateway (IPsec GW). In some implementations of the embodiments, the PGW is configured to operate in local breakout mode (LBO).

Aspects of the embodiments are directed to a mobile virtual network that includes a home subscriber server (HSS) implemented at least partially in hardware, the HSS comprising a database of subscribers and, for each subscriber, information about authorized cellular networks each subscriber is authorized to connect to. The HSS is configured to receive a request for authentication of user equipment (UE) to connect to a cellular network from a mobility management entity associated with the cellular network; and determine that the UE is authorized to connect to the cellular network. A virtual mobility anchor network element implemented at least partially in hardware is configured to establish an Internet Protocol address for the UE; and provide the IP address to an Internet gateway node associated with the cellular network.

In some implementations of the embodiments, the HSS is configured to receive location update information about a location of the UE. In some implementations of the embodiments, the HSS is configured to determine that the UE is authorized to access a plurality of cellular networks in a location; determine a preferred cellular network from the plurality of cellular networks; and authenticate the UE to connect to the preferred cellular network. In some implementations of the embodiments, the HSS determines the preferred cellular network based on one or more of a quality of service of the preferred cellular network, subscription parameters for the UE, or pricing. In some implementations of the embodiments, the plurality of cellular networks comprises a plurality of cellular networks associated with different mobile network operators.

FIG. 1 is a schematic block diagram of a wireless network 100 that includes a mobile virtual network operator hosting a virtual mobility anchor node in accordance with embodiments of the present disclosure. The wireless network 100 includes a mobile virtual network operator (MVNO) 102 that can communicate with one or more networks, such as that operated by mobile network operator (MNO)-A 110 and MNO-B 120. The MVNO 102 can include one or more servers that provide networking functionality. For example, MVNO 102 includes a virtual mobility anchor node (VMAN) 104 and a home subscriber server 106. The VMAN 104 can be implemented in hardware, software, or a combination of hardware and software. The VMAN 104 can be, for example, a Dynamic Host Configuration Protocol (DHCP) server uses a network protocol used to assign IP addresses and provide configuration information to devices such as servers, desktops, mobile devices, etc., so they can communicate on a network using the Internet Protocol (IP). VMAN104 can be hosted, however, on any network host in the MVNO network 102, and can be instantiated in a service cloud 108. The VMAN 104 can provide virtual mobility anchoring functionality. Virtual mobility anchoring is a function that includes allocation of IP address and corresponding IP address configuration to the mobile node (or UE per 3GPP terminology) anchored in a MNO network, such as MNO-A 110 or MNO-B 120. The virtual mobility anchoring functionality also includes allocation/de-allocation of IP address management.

In some embodiments, the role of the VMAN 104 also includes mobility session management, which can include IP address management and forwarding/routing management for the allocated IP addresses.

The VMAN 104 is aware of the mobile node's current location. For example, the VMAN 104 can be in communication with HSS 106, which can receive location update information from the mobile node through whatever network it is connected to. The VMAN 104 also knows which Internet gateway node (e.g., packet gateway node (PGW) 116 or 126) in the MNO's network the mobility session is anchored because session management includes communications with the Internet gateway node for session setup, IP management, and forwarding/routing management. The VMAN 104 can forward all the UE traffic to that Internet gateway node.

The VMAN 104 also performs forwarding/routing management for IP traffic. The VMAN 104 can facilitate service function augmentation 110 to IP packets. The VMAN 104 can also use packet inspection and other techniques to collect information about the IP traffic. The meta-data that gets carried in the network service header includes the mobile node's identifiers (IMSI, MSISDN, NAI . . . etc.), MNO/PGW to which the mobile is attached and the network location (cell ID/GPS location), etc. This meta-data can be used by other network function in the service chain for providing other capabilities such as accounting, Network Address Translation, Deep Packet Inspection, etc.

The VMAN 104 can be in communication with one or more MNO networks through an interconnect, such as a multi-protocol label switching (MPLS) interconnect 130. The MPLS interconnect 130 can facilitate communications between the MVNO 102 and each of MNO-A 110 and MNO-B 120. Additionally, the MPLS interconnect 130 can facilitate communications between MNO-A 110 and MNO-B 120.

The MNO network can include one or more core network elements that allow a mobile device or UE to communicate with other mobile devices through a cellular network or IP network. An example MNO network can include on that provides cellular services using LTE.

MNO-A 110 can include core network elements, such as a packet gateway (PGW) 116, a mobility management entity (MME) 114, and a serving gateway (SGW) 118, as well as other core network elements. The MNO-A 110 can also include one or more base stations that can provide an air interface between the core network and the mobile device. For example, for an LTE network, the MNO-A 110 can include eNB 112A, eNB 112B, etc.

The PGW 116 can be considered an Internet gateway node. The internet gateway node can include a network interface implemented at least partially in hardware and a processor implemented at least partially in hardware. The Internet gateway node configured to send a request for an Internet Protocol (IP) address to a virtual mobility anchor node associated with a mobile virtual network operator (MVNO) for a user equipment (UE). The Internet gateway node can receive an IP address from the virtual mobility anchor node and allocate the IP address to the UE. The Internet gateway node can also be configured to receive IP traffic from the UE and forward the IP traffic to the virtual mobility anchor node. The Internet gateway node can receive IP traffic from the virtual mobility anchor node destined for the UE and forward the IP traffic to the UE. The Internet gateway node can be one of a packet gateway (PGW), a Wireless Access Gateway (WAG), or an IP Security Gateway (IPsec GW).

MNO-A 120 can include core network elements, such as a packet gateway (PGW) 126, a mobility management entity (MME) 124, and a serving gateway (SGW) 128, as well as other core network elements. The MNO-A 120 can also include one or more base stations that can provide an air interface between the core network and the mobile device. For example, for an LTE network, the MNO-A 120 can include eNB 122A, eNB 122B, etc. As will be understood from other portions of this disclosure, the MNO network can be other types of networks, such as wireless local area networks, which may include other network elements.

In embodiments of the disclosure, the MVNO 104 can provide communications services through an MNO's network without having to lease the core network elements from the MNO. Embodiments of the disclosure facilitate minimizing such architectural dependencies and allow MVNOs 104 to give more options to the subscriber for connecting to communications services architectures.

In the current disclosure, it is assumed that the MVNO 104 owns the subscriber and the decision on what networks to connect in what areas is for allowing the MVNO to dictate. An MVNO is configured to be able to establish wholesale agreement with multiple MNO's, Broadband Operators and with Wi-Fi service providers. Based on the location and pricing agreements associated with various MNO agreements, the MVNO can decide which MNO network that the device should attach to.

The MVNO network 104 is configured to control device authentication and authorization to the mobile network. The MVNO network 104 is not required to operate the core network, or any of the core functions. Rather, the MNO network 110 or 120 provides the core network elements and radio access network (RAN) elements. The minimal requirement is for the MVNO network 104 to host the HSS for controlling the device authentication and service authorization and to provide virtual mobility anchoring functionality, as described above.

MVNO network 104 is configured to perform accounting on the mobile traffic and should be able to enforce dynamic QoS support on the mobile traffic.

MVNO network 104 is configured to obtain the location information of the mobile device.

The mobile device's IP traffic enters and exits from the MVNO's IP cloud to facilitate, among other things, analytics and targeted advertising.

Optimized IP mobility support is provided by the VMAN 102 for a mobile roaming between two MNO partner networks. The LTE PGW hosting the session may change from one MNO's network to the other, but IP address continuity is supported by the VMAN 102 management of IP address configuration.

Virtual Mobility Anchor

To support the above-identified requirements for LTE network sharing, the subscriber's IP session is topologically anchored in the MVNO network 102, but the corresponding LTE session is anchored in the core network of the MNO network 110 or 120. There are essentially two anchors for any subscriber's session, an IP anchor in the MVNO network 102 and a LTE session anchor in the MNO network 110 or 120. The function anchoring the IP session in the MVNO network is referred to as a Virtual Mobility Anchor (VMA) hosted in a VMAN 104, and the function anchoring the LTE session in the core network is the standard 3GPP PGW function. This two node IP anchoring relation is realized by steering the traffic from the VMAN 104 to the PGW that is currently hosting a LTE subscriber session.

All the subscriber's IP traffic is routed through the VMAN 104 and the MVNO network 102 retains control on the subscriber's traffic. The MVNO network 102 is not required to host any of the 3GPP core network functions or the radio network. The VMAN 104 will run the subscriber flows through the generic IP service functions in the cloud for any service requirements.

The approach does not require a new signaling interface between the PGW 116 and the VMAN 104. Dynamic Host Configuration Protocol (DHCP) triggers from the PGW 116 can be used to replace the mobility signaling events. Optionally, other interfaces can be used in addition to DHCP. These interfaces are for the network functions in the MNO and MVNO to request/release IP address configuration.

The PGW 116 is configured to receive IP address configuration and allocation information from the VMAN 104. The PGW 116 can provide the IP address configuration and allocation to the mobile device that is managed by the MVNO network 102 and attempting to use the core network 110 or 120 for communications. The IP traffic for the mobile device is routed through the PGW 116 and the MVNO network 102.

Assumptions

The IMSI/MSISDN space allocated to the MVNO subscriber's mobile devices are from the MVNO space. The HSS 106 is operated by the MVNO network 102.

Device authentication and authorization is controlled by HSS 106. The HSS 106 will be connected to the global inter-operator Internetwork Packet Exchange (IPX) network.

Inter-connect roaming agreements exist between partner MNO's and the MVNO. Typical options for interconnect include L2/L3 VPN's, or overlay tunnels between PGW and the VMAN 104.

The MVNO's APN is hosted by the PGWs 116 or 126 in each of the partner MNO networks 110 or 120, respectively. The DNS resolutions of the APN in any of the MNO networks always point to the PGWs in the respective MNO's network hosting that APN.

In embodiments, the PGWs hosting the MVNO's APN can be configured to operate in Local-Breakout (LBO) mode. However, the LBO traffic is not offloaded to Internet but the traffic is routed to MVNO's network over the L2/L3 VPN to the VMAN 104.

Virtual Mobility Anchor Considerations

The virtual mobility anchor is a function that can be collocated with the DHCP server. A DHCP server that includes a virtual anchor function can be considered a virtual mobility anchor node (VMAN), such as VMAN 104. The VMAN 104 provides virtual mobility anchoring functionality, which is a lightweight function for managing IP forwarding states. The VMAN 104 interfaces with the collocated DHCP server, monitors the DHCP events and manages the forwarding for the DHCP allocated addresses/prefixes. Virtual mobility anchor has no awareness to any specific system architecture, or it has any access awareness; the functionality is an IP layer forwarding function.

Any time an access specific function such as Broadcast Network Gateway (BNG), PGW or IPsec gateway sends a DHCP Request, the message is tunneled/routed to the VMAN 104. The VMAN 104 allocates the IP address/prefix and also sets up the IP forwarding towards the access network that made the request. The DHCP request will be included in the IMSI/MSISDN as the client identifier and these identifiers will be used for session correlation. The proposed approach does not result in any host route pollution, as the addresses are present only in the shared MNO-MVNO VRF context and the state is present only in the VMAN 104.

Figure 2:
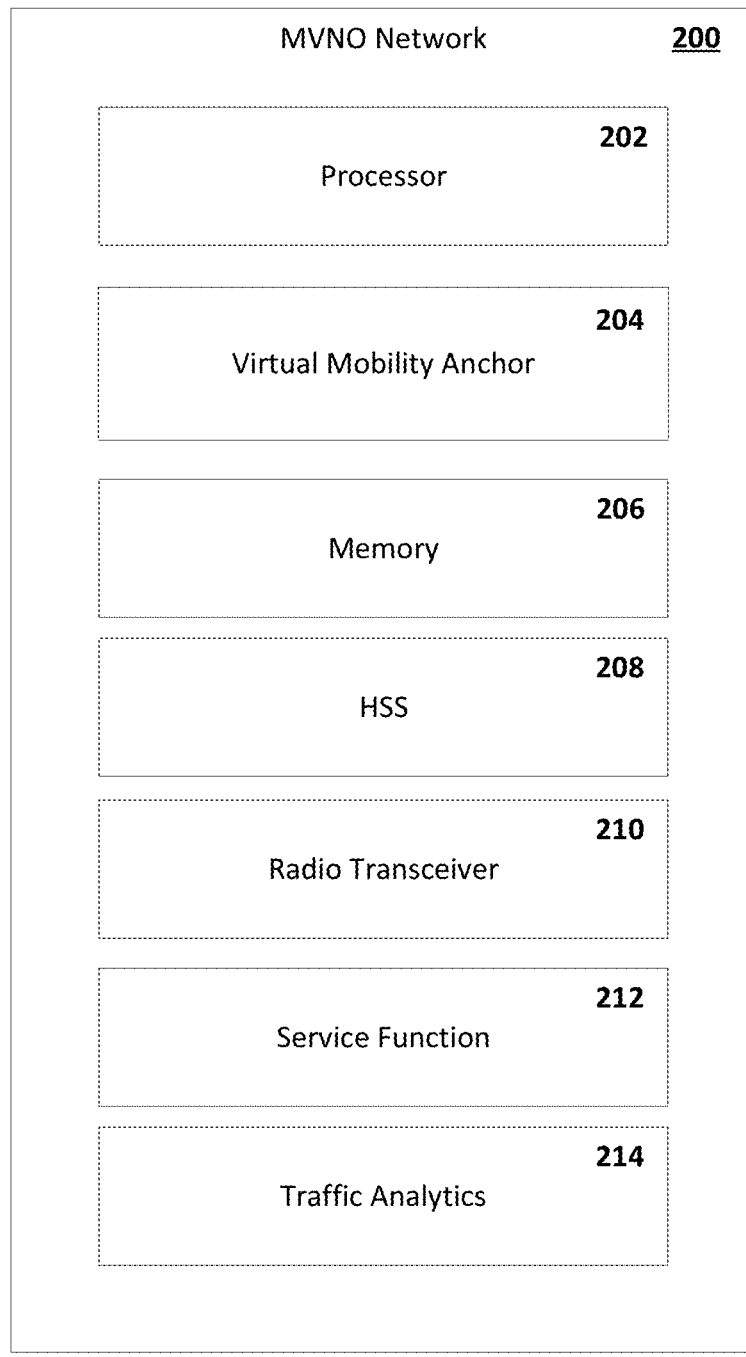
FIG. 2 is a schematic block diagram of an example mobile virtual network operator (MVNO) network node in accordance with embodiments of the present disclosure.

FIG. 2 is a schematic block diagram of an example mobile virtual network operator (MVNO) network 200 in accordance with embodiments of the present disclosure. The MVNO network 200 can include network elements that facilitate communication for a mobile device through a mobile network operator (MNO). For example, the MVNO network 200 includes a processor 202 implemented at least partially in hardware and a memory 206. The MVNO network 200 can include a home subscriber server (HSS) 208. The virtual mobility anchor 204 can be instantiated on a server associated with the MVNO network 200, such as the DHCP server. In general, the virtual mobility anchor 204 can reside on a virtual mobility anchor node (VMAN).

The HSS 208 can include a database that contains user-related and subscriber-related information. The user-related information and subscriber-related information can include information that allows the HSS 208 to help in selecting and connecting to a MNO managed network. For example, the HSS 208 can include a list of approved networks that the user's subscription to one or more networks, a quality of service threshold for connecting to or changing networks, pricing information for dynamically connecting to different networks, etc.

The HSS 208 also provides support functions in mobility management, call and session setup, user authentication and access authorization. In embodiments, the HSS 208 can provide a list of ordered and preferred networks to the mobile device as to which preferred network it should attach to. The HSS 208 can provide this information dynamically based on location/time of the day/policy.

The MVNO network 200 can include a radio transceiver 210 for communicating with other entities, such as an MNO network or through a MPLS interconnect or through the Internet. The radio transceiver 210 can also be used to receive IP traffic and forward IP traffic to and from the mobile device. The server serving the virtual mobility anchor 204 can also process incoming IP traffic for traffic analysis 214. The virtual mobility anchor 204 can also facilitate service function augmentation to IP packets.

Figure 3:
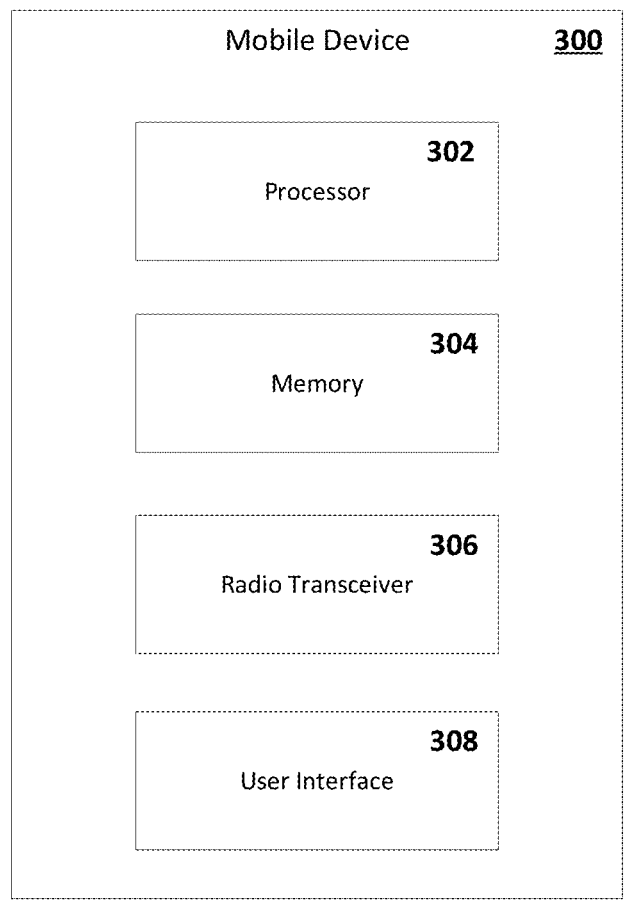
FIG. 3 is schematic block diagram of an example mobile device in accordance with embodiments of the present disclosure.

FIG. 3 is schematic block diagram of an example mobile device 300 in accordance with embodiments of the present disclosure. The mobile device 300 can be a user equipment, to use 3GPP terminology. The mobile device 300 can be a cellular phone, smart phone, tablet device, laptop computer, or other mobile device.

The mobile device 300 includes a processor 302 implemented at least partially in hardware and a memory 304 for storing instructions. The mobile device 300 also includes a user interface 308 for allowing a user to interact with the mobile device 300 and to send and receive information from network locations, such as from the Internet or from other mobile devices or other devices in general. The mobile device 300 also includes a radio transceiver 306 configured to transmit and receive wireless signals.

The mobile device 300 is configured to search for networks and attempt to attached to a network to facilitate wireless communications. In embodiments of the disclosure, the mobile device 300 is configured to be able to communicate through any subscribed network, and is not limited to a single MNO's network due to the mobile device 300 associated with the MNO. Rather, the mobile device 300 is associated with an MVNO that provides a virtual mobility anchor functionality, which allows the mobile device 300 to connect to any of a plurality of MNO networks. The mobile device 300 can scan for any available network, or any available network available for the user subscription, which includes networks owned/operated by more than one MNO.

Figure 4:
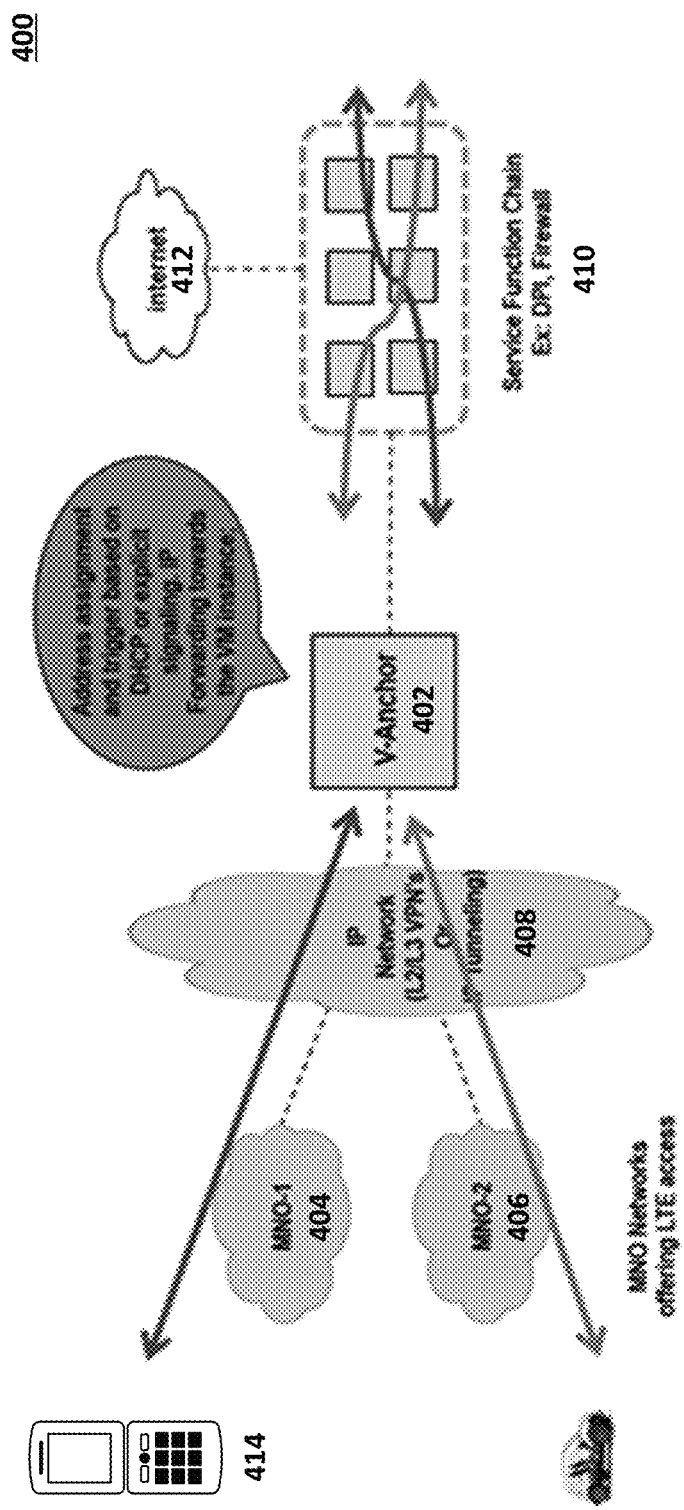
FIG. 4 is a schematic diagram of a virtual mobility anchor in communication with a plurality of networks.

FIG. 4 is a schematic diagram of a virtual mobility anchor in communication with a plurality of networks. The virtual mobility anchor 402 (shown as V-Anchor 402 in FIG. 4) can be in communication with a mobile device 414 through a communications connection, such as through an IP network 408. The virtual mobility anchor 402 is instantiated in a service cloud associated with an MVNO, which manages the IP sessions for the mobile device 414. The IP traffic from the mobile device 414 is directed from the MNO network 1 404 to which the mobile device is attached to the virtual mobility anchor 402. The virtual mobility anchor 402 performs forwarding and routing of the IP traffic to a network destination, such as the Internet 412 or to destination addresses at other networks 406 or to other mobile devices. Additionally, the virtual mobility anchor 402 can facilitate service function chaining, such as deep packet inspection, addition of firewall, etc.

Approaches for roaming and network selection in 3GPP are typically based on a static policy, and the home operator does not influence the decision of the access operator dynamically on a location/time basis. Static policies cannot provide variability in connection options based on different pricing agreements the MVNO may have with different operators in different locations. The ability to influence the selection of the MNO network on a location basis is described below. This approach allows dynamic selection of the roaming partner at the time of HSS attach.

Current 3GPP specifications such as TS 29.272 (S6a) are not designed to direct the roaming UE to a specific roaming network if more roaming networks are available in the specific roaming location. The roaming UE is using the preferential static list stored in the device to select a roaming network. The list of networks is static and may not be updated dynamically when the UE is roaming.

This disclosure describes modifying the parameters (information elements) in the existing 3GPP procedures to provide information from the home HSS at the MVNO network to the roaming UE to attach to a specific targeted network in the specific location based on specific information. Instead of the roaming UE having a provisioned list of preferred networks and the set of priorities identifying which network to select if more networks are available at the specific roaming location, this disclosure describes using the MME-HSS procedures and directing the roaming UE to attach to a specific network in the roaming location.

Figure 5:
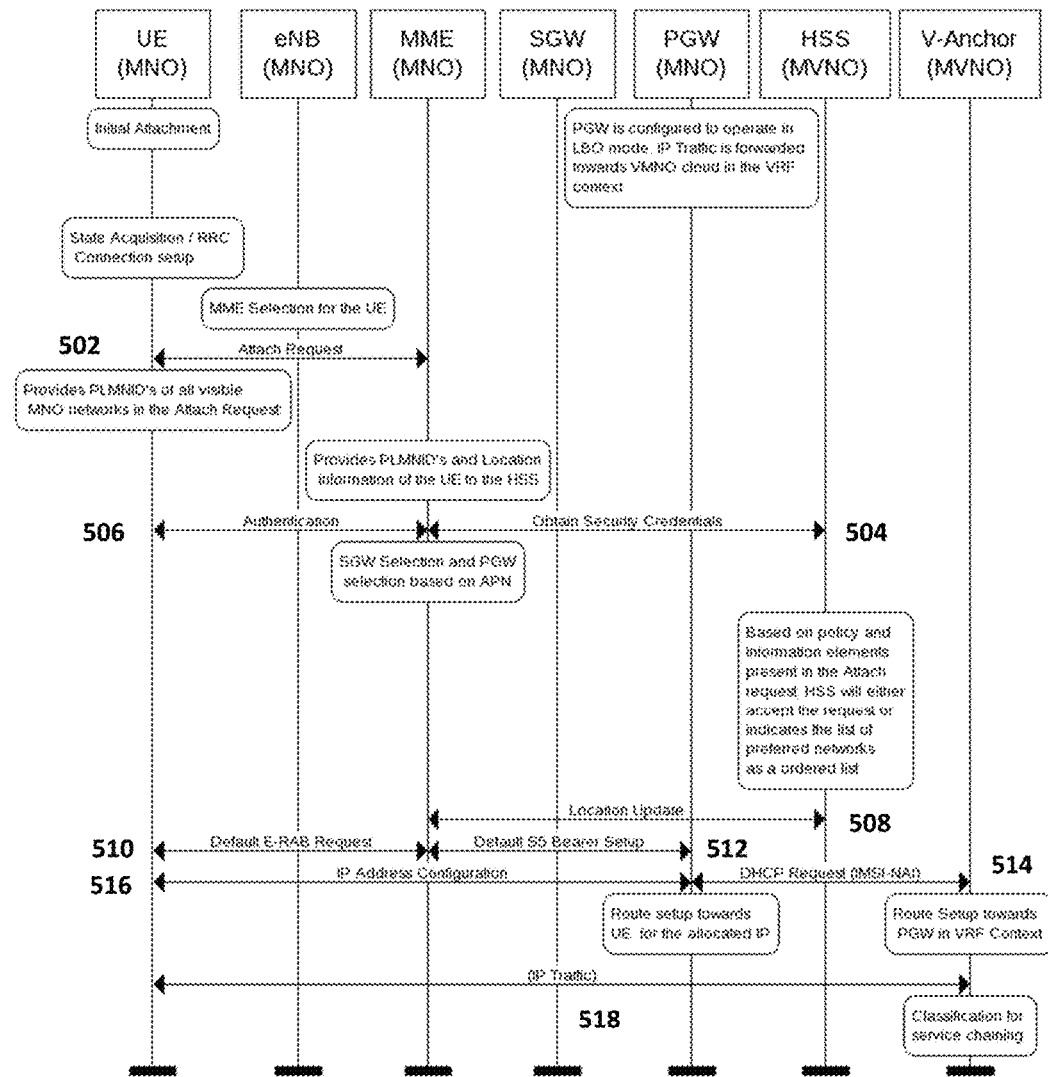
FIG. 5 is a process flow diagram for an example initial attachment to a network by a virtual mobility anchor in accordance with embodiments of the present disclosure.

FIG. 5 is a process flow diagram 500 for an example initial attachment to a network by a virtual mobility anchor in accordance with embodiments of the present disclosure. The UE can trigger an initial attachment to an MNO's network using standard session set up, such as RRC connection setup and/or attachment requests (502). The UE can communicate through a radio access network (RAN) base station with an MME. The UE provides the PLMNIDs of all visible MNO networks in the initial attachment request sent to the MME.

The MME in the visited network sends an Authentication Information Request (AIR) S6a message to the UE's home HSS (504). The AIR S6a message carries IMSI, visited PLMN-ID, etc. Based on AIR message information, the home HSS will accept the request for attachment based on the device credential and the roaming network business agreements. The MME can authenticate the UE (506). At this point, however, the home HSS does not know where the UE is geographically located and does not know what the roaming UE location is for allowing the roaming UE authentication.

In order to instruct the roaming UE from the home HSS what network to connect to, the Authentication-Information-Request (AIR) message carries additional parameters that indicate the roaming geographic UE location that will be provided by the visited MME that received the NAS message from the roaming UE. The Update-Location-Request (ULR) S6a message can be sent from the MME in the visited network to the home HSS to provide the identity of the visited MME currently serving the roaming UE (508). Additionally, the home HSS can include policy information and information elements for the mobile device, such as subscriber information. Based on that new location information received in the AIR message and the subscriber information, the home HSS will respond with Authentication-Information-Answer (AIA) message with the following relevant result parameter values:

Success—it is indication to the roaming UE to attach to the visited PLMN;

Error code that would represent the new visited PLMN that the roaming UE should connect. Based on this error code it will indicated to the visited MME not to allow the roaming UE to attach. The error code would be delivered to the roaming UE and it will be used by the UE to attach to another visited PLMN that is better suited for that location. The Error code can be included with a message indicating a list of preferred networks as an ordered list to which the mobile device can attach.

The UE can then make an EUTRAN Radio Access Bearer request to the visited MME (510). The visited MME can then perform a default S5 bearer setup with the visited packet gateway (PGW) (512). The visited PGW can then perform a DHCP request (through a DHCP request message) to the virtual mobility anchor (514). The virtual mobility anchor can allocation an IP address for the UE and provide the IP address to the PGW. The PGW can then provide the IP address configuration to the UE (516). The allocated address can be IPv4 and/or IPv6 address or a prefix. In other words, the IP address can be a single 32-bit IPv4 address or a set of IPv4 addresses; and/or single IPv6 prefix/subnet or a set of IPv6 prefixes.

IP traffic from the UE is routed through the visited PGW to the virtual mobility anchor, and the virtual mobility anchor routes IP traffic to the UE through the visited PGW (518).

In some embodiments, the PGW can be configured to operate in LBO mode. IP traffic is forwarded towards the virtual mobility anchor in the VRF context.

Figure 6:
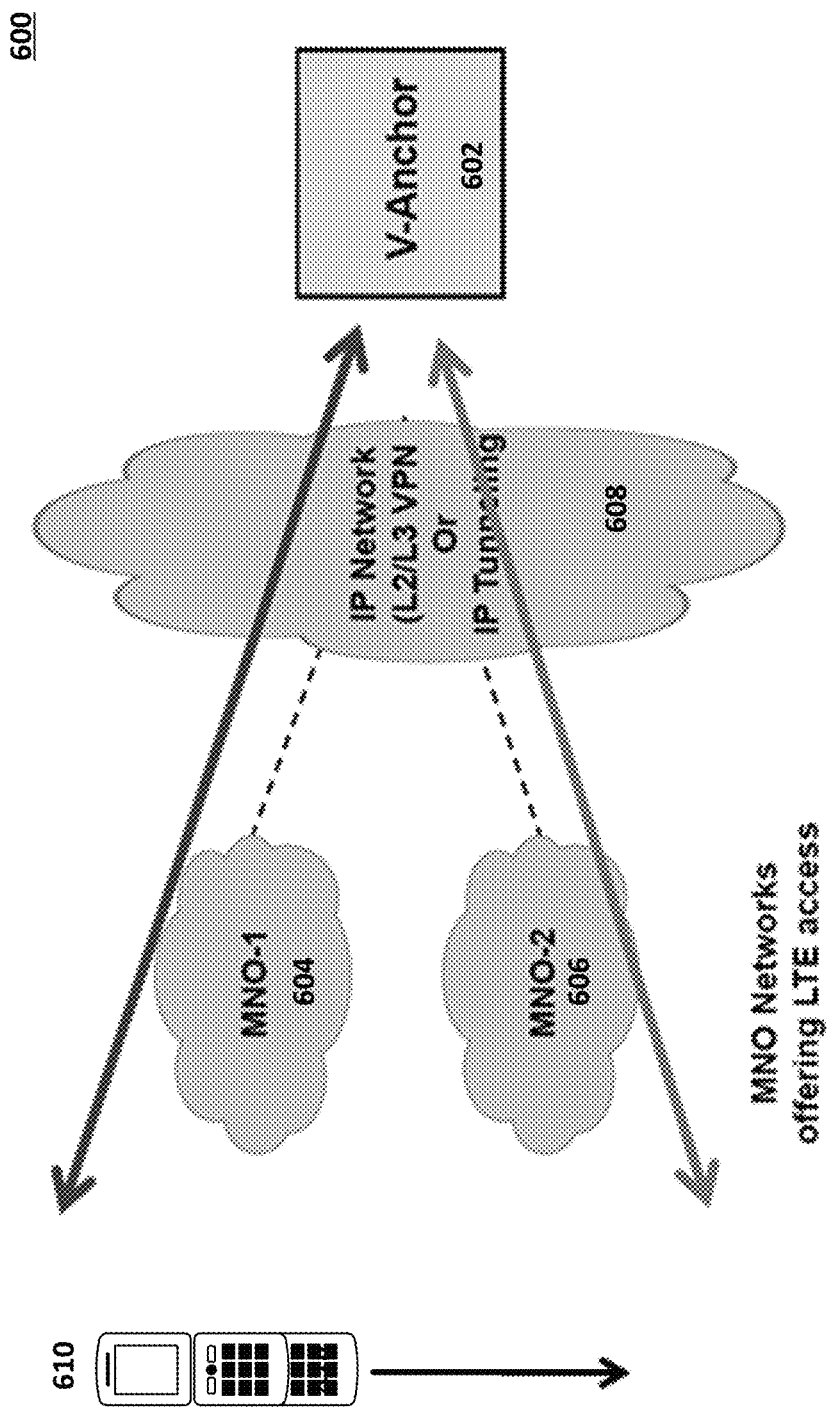
FIG. 6 is a schematic diagram of a virtual mobility anchor facilitating roaming between networks in accordance with embodiments of the present disclosure.

FIG. 6 is a schematic diagram 600 of a virtual mobility anchor facilitating roaming between networks in accordance with embodiments of the present disclosure. The system architecture of FIG. 6 is similar to that of FIG. 4. The virtual mobility anchor 602 facilitates transition of the UE 610 from one MNO network 604 to another MNO network 606. The communication can be performed through an IP network 608. The virtual mobility anchor 602 provides the same IP address to the new MNO network 606 that it used for the previous IP session with the first MNO network 604.

Figure 7:
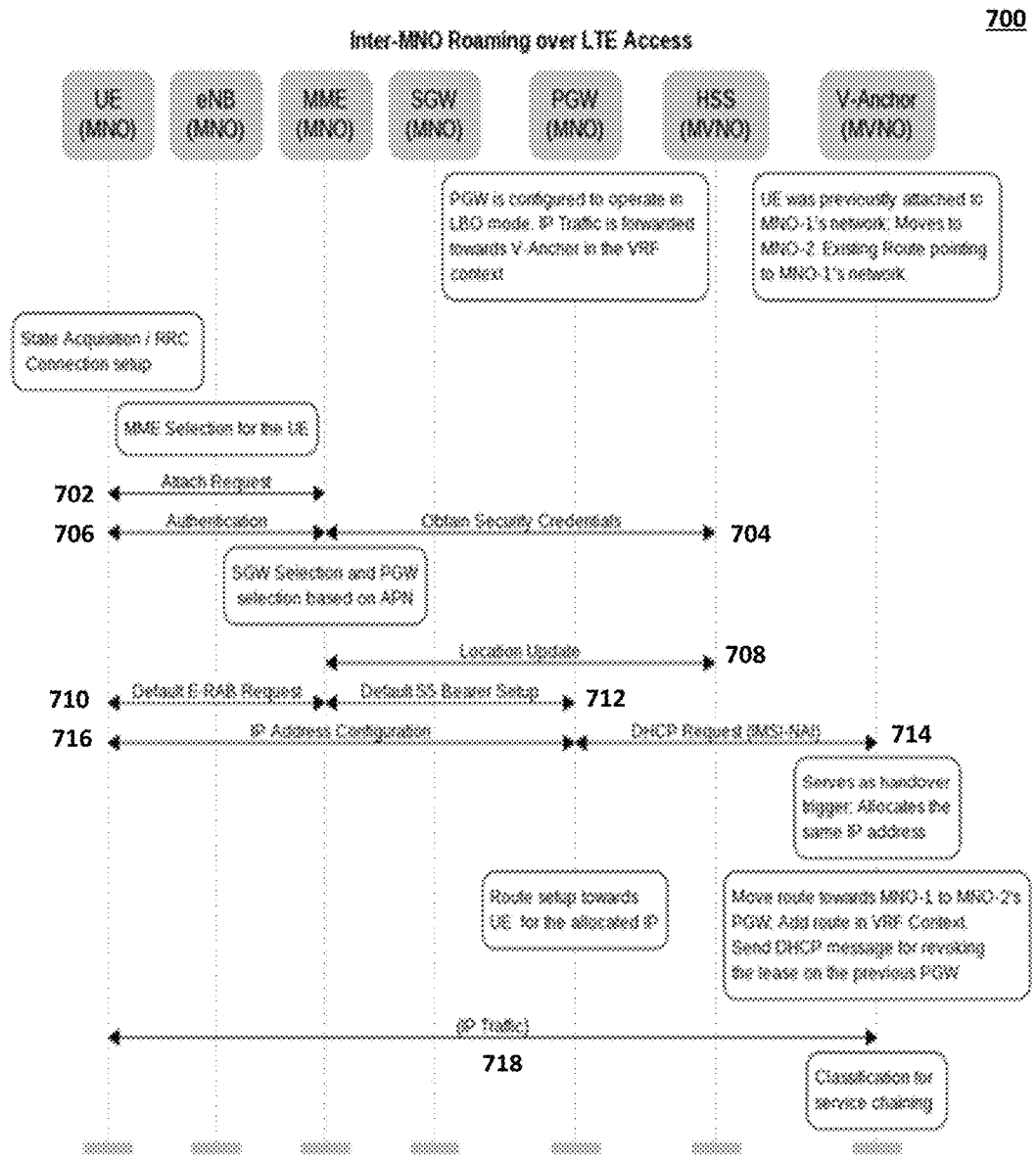
FIG. 7 is a process flow diagram for facilitating cellular network operator roaming in accordance with embodiments of the present disclosure.

FIG. 7 is a process flow diagram 700 for facilitating cellular network operator roaming in accordance with embodiments of the present disclosure. For FIG. 7, the UE has performed an initial attachment to a first MNO network, as described in FIG. 5. The UE can trigger a handover from a first MNO network to a second MNO network, and can send an attachment request, such as a RRC connection setup and/or attachment request, to the second MNO network (702). The UE can communicate through a radio access network (RAN) base station with an MME of the second MNO network.

The MME in the visited network sends an Authentication Information Request (AIR) S6a message to the UE's home HSS (704). The AIR S6a message carries IMSI, visited PLMN-ID, etc. Based on AIR message information, the home HSS will accept the request for attachment based on the device credential and the roaming network business agreements. The MME can authenticate the UE (706). At this point, however, the home HSS does not know where the UE is geographically located and does not know what the roaming UE location is for allowing the roaming UE authentication.

In order to instruct the roaming UE from the home HSS what network to connect to, the Authentication-Information-Request (AIR) message carries additional parameters that indicate the roaming geographic UE location that will be provided by the visited MME that received the NAS message from the roaming UE. The Update-Location-Request (ULR) S6a message can be sent from the MME in the visited network to the home HSS to provide the identity of the visited MME currently serving the roaming UE (708).

The UE can then make an EUTRAN Radio Access Bearer request to the visited MME (710). The visited MME can then perform a default S7 bearer setup with the visited packet gateway (PGW) (712). The visited PGW can then perform a DHCP request (through a DHCP request message) to the virtual mobility anchor (714). The DHCP request can serve as a handover trigger for the virtual anchor to allocate the same IP address the UE was previously using (in the same IP session but with a different MNO network) to the UE for use with the current MNO network. The virtual mobility anchor can allocation an IP address for the UE and provide the IP address to the PGW. The PGW can then provide the IP address configuration to the UE (716). The virtual mobility anchor can move the routing of IP traffic to MNO-2's PGW. The route can be added in the VRF context. Virtual mobility anchor can send a message, such as a DHCP message, to the PGW of the previous MNO network (MNO-1) requesting release of the IP address.

The virtual mobility anchor manages a mobility session. This mobility session has a state and that state includes an IP address configuration and a forwarding state. The virtual mobility anchor can create/delete this state. When there is a session and an associated state, all the UE IP traffic from network-destination first hits the virtual mobility anchor, which in turn forwards the IP traffic to the PGW where the mobile node is anchored. When the session is removed, all the associated state is gone and the PGW is notified.

IP traffic from the UE is routed through the visited PGW to the virtual mobility anchor, and the virtual mobility anchor routs IP traffic to the UE through the visited PGW (718). The PGW of MNO-2 (the new MNO network) can route IP traffic to the UE. The PGW can also route outbound IP traffic to the virtual mobility anchor.

Figure 8:
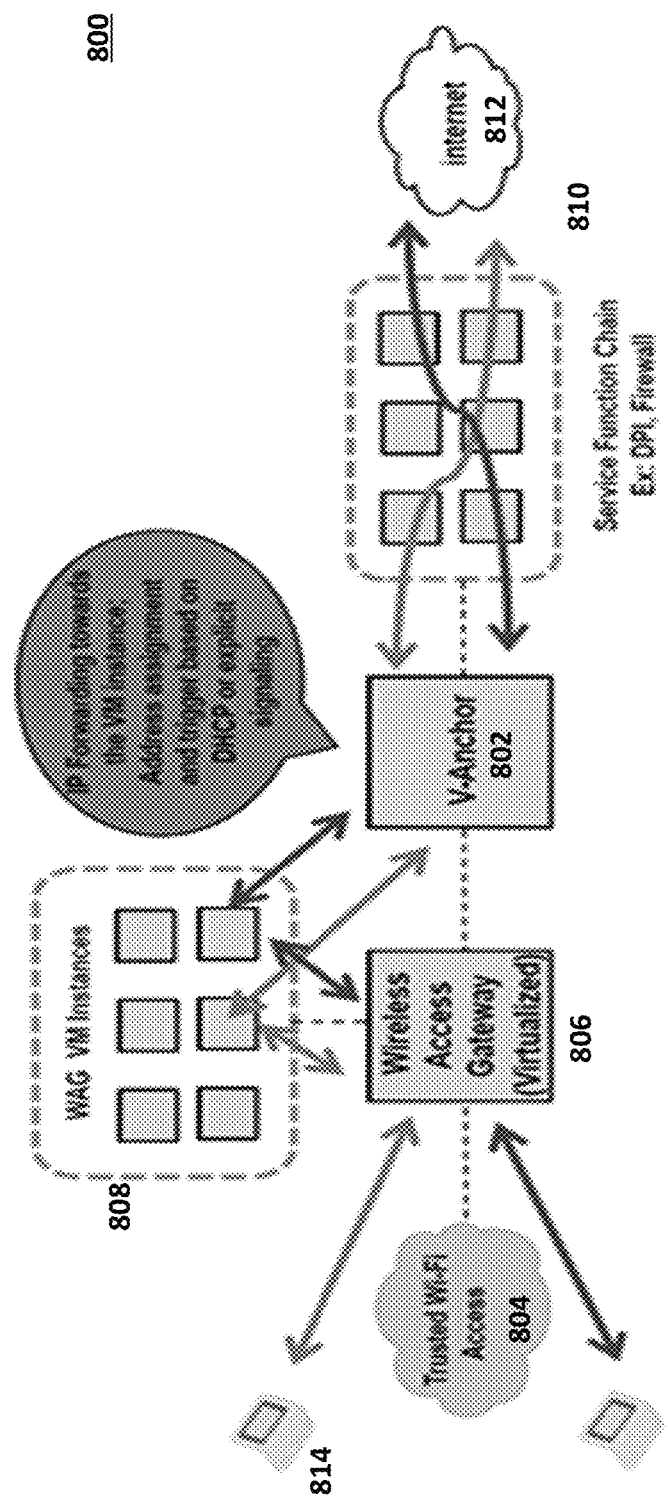
FIG. 8 is a schematic diagram of a virtual mobility anchor facilitating roaming between a cellular network and a trusted wireless local area network in accordance with embodiments of the present disclosure.

FIG. 8 is a schematic diagram 800 of a virtual mobility anchor facilitating roaming between a cellular network and a trusted wireless local area network in accordance with embodiments of the present disclosure. The virtual mobility anchor 802 can manage IP sessions with trusted wireless local area networks, such as trusted Wi-Fi networks 8040. The virtual mobility anchor 802 can communicate with wireless access gateway (WAG) instances 808 instantiated on virtual machines. The WAG can be virtualized for communications with the Wi-Fi network and corresponding connected devices 814. The virtual mobility anchor can direct IP traffic from the Internet 812 or other network locations to a mobile device 814 via a trusted Wi-Fi network. The virtual mobility anchor 802 can also perform service function augmentation of IP packets (810).

Figure 9:
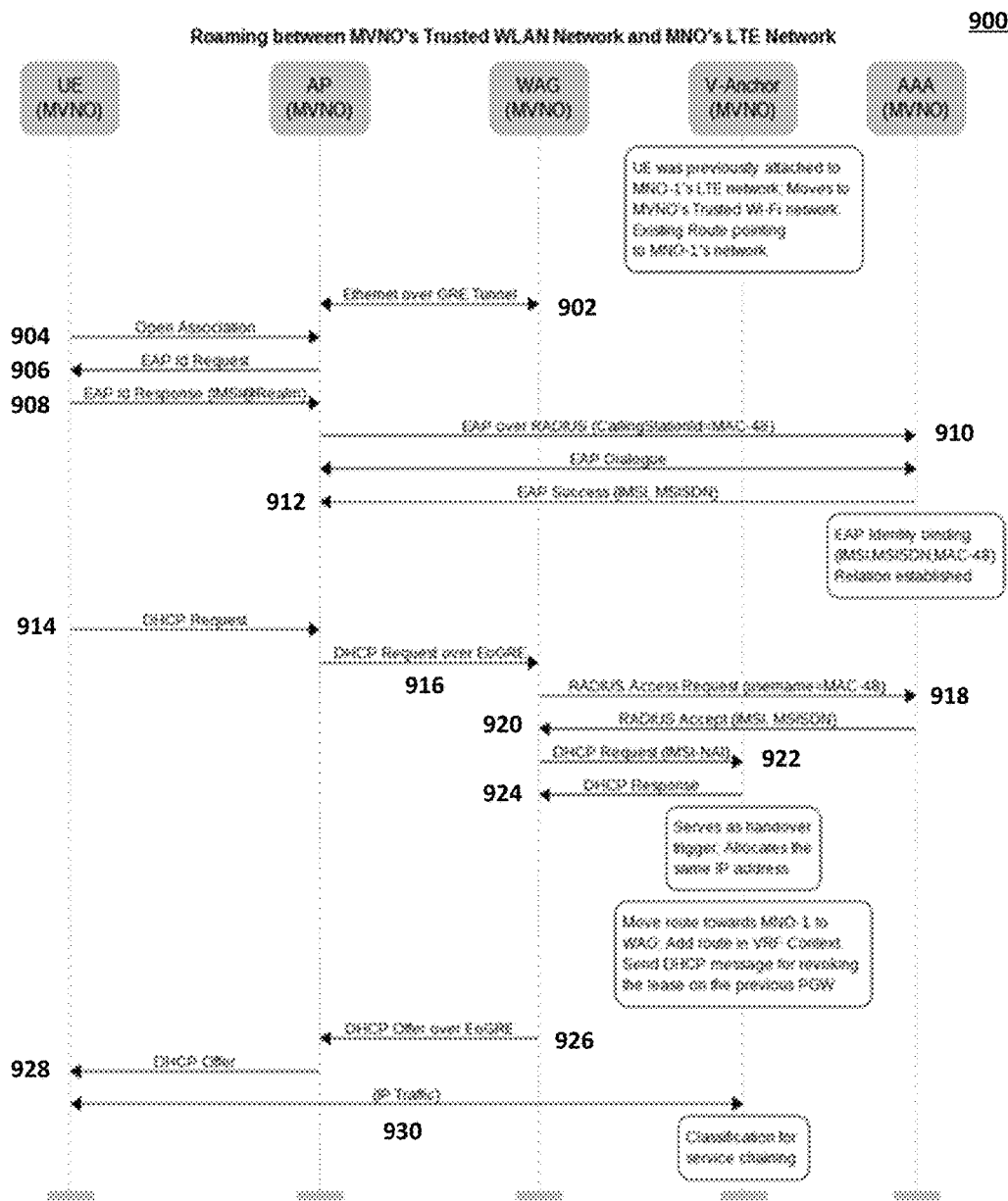
FIG. 9 is a process flow diagram for facilitating roaming between a cellular network and a trusted wireless local area network in accordance with embodiments of the present disclosure.

FIG. 9 is a process flow diagram 900 for facilitating roaming between a cellular network and a trusted wireless local area network in accordance with embodiments of the present disclosure. At the outset, the UE is attached to a first MNO network, which can be an LTE network. The existing IP routing is pointing to the first MNO network. The UE moves to a Wi-Fi network trusted by the MVNO managing the UE's mobility session.

The access point of the Wi-Fi network can provide Ethernet over a Generic Routing Encapsulation tunneling (902). The UE can begin attachment to an access point (AP) via an open association (904). The AP can send the UE an Extensible Authentication Protocol (EAP) ID request (906). The UE can respond to the AP with an EAP ID response, that can include an IMSI. The AP can transmit the EAP over a secure connection to an Authentication, Authorization, and Accounting (AAA) server (910). In some embodiments, the AP can use a RADIUS server for authentication. The AP and the AAA server can exchange information to perform the authentication and authorization for the UE's attachment to the AP. The AAA server can then transmit an EAP success message to the AP that includes the IMSI and the MSISDN (912).

The UE can then send a DHCP request to the AP (914). The AP forwards the DCHP request to the WAG (916). The WAG can then a RADIUS access request to the AAA server (918). The AAA server provides an accept message back to the WAG (920). The WAG can then send a DHCP request to the virtual mobility anchor (922). The virtual mobility anchor can send a DHCP response to the WAG (924). The DHCP request can server as a handover trigger. The virtual mobility anchor can use UE identification information and other information to assign a previously allocated IP address to the WAG for use in the handover IP session. The virtual mobility anchor can move routing from the PGW of the first MNO network to the WAG of the trusted WLAN. The virtual mobility anchor can also add a route in VRF context. The virtual mobility anchor can also send a DHCP message to the PGW of the first MNO network instructing the PGW to release the IP address so it can be used in the current IP session with the WAG.

The WAG can send the DHCP offer to the AP that includes the IP address configuration (926). The AP can forward the DHCP offer to the UE to set up the communications channel (928). IP traffic to and from the UE can now be managed by the virtual mobility anchor through the AP and the WAG (930). The virtual mobility anchor can perform classification and service function augmentation on IP packets.

Figure 10:
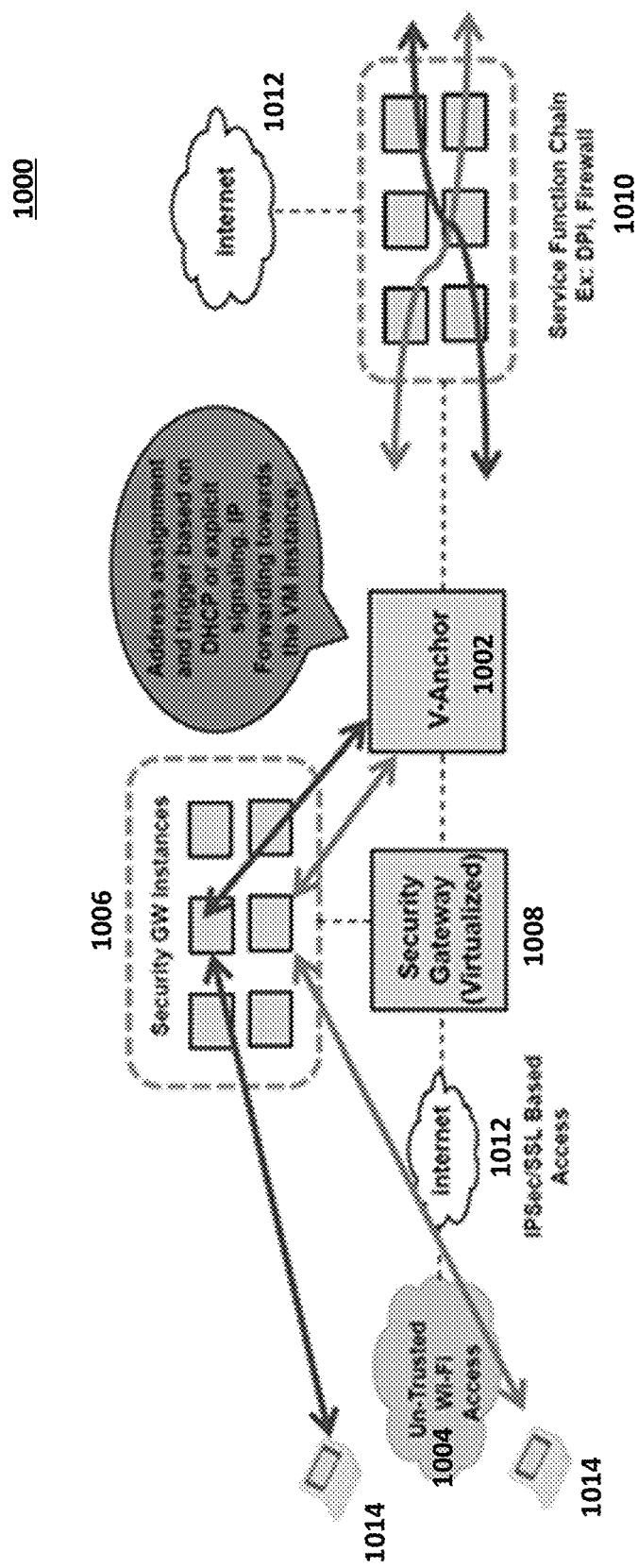
FIG. 10 is a schematic diagram of a virtual mobility anchor facilitating roaming between a cellular network and an untrusted wireless local area network in accordance with embodiments of the present disclosure.

FIG. 10 is a schematic diagram 1000 of a virtual mobility anchor facilitating roaming between a cellular network and an untrusted wireless local area network in accordance with embodiments of the present disclosure. The virtual mobility anchor 1002 can manage IP sessions for a mobile device 1014 through an attachment to an untrusted wireless local area network (such as a Wi-Fi connection) 1004 through an internet connection 1012 (such as IPsec or SSL based access). The virtual mobility anchor 1002 can communicate with the untrusted Wi-Fi 1004 through a security gateway 1008 virtualized from among a set of security gateways 1006. IP traffic is routed through the virtual mobility anchor 1002 to network locations, such as the Internet 1012. The virtual mobility anchor can provide service function chaining 1010.

Figure 11:
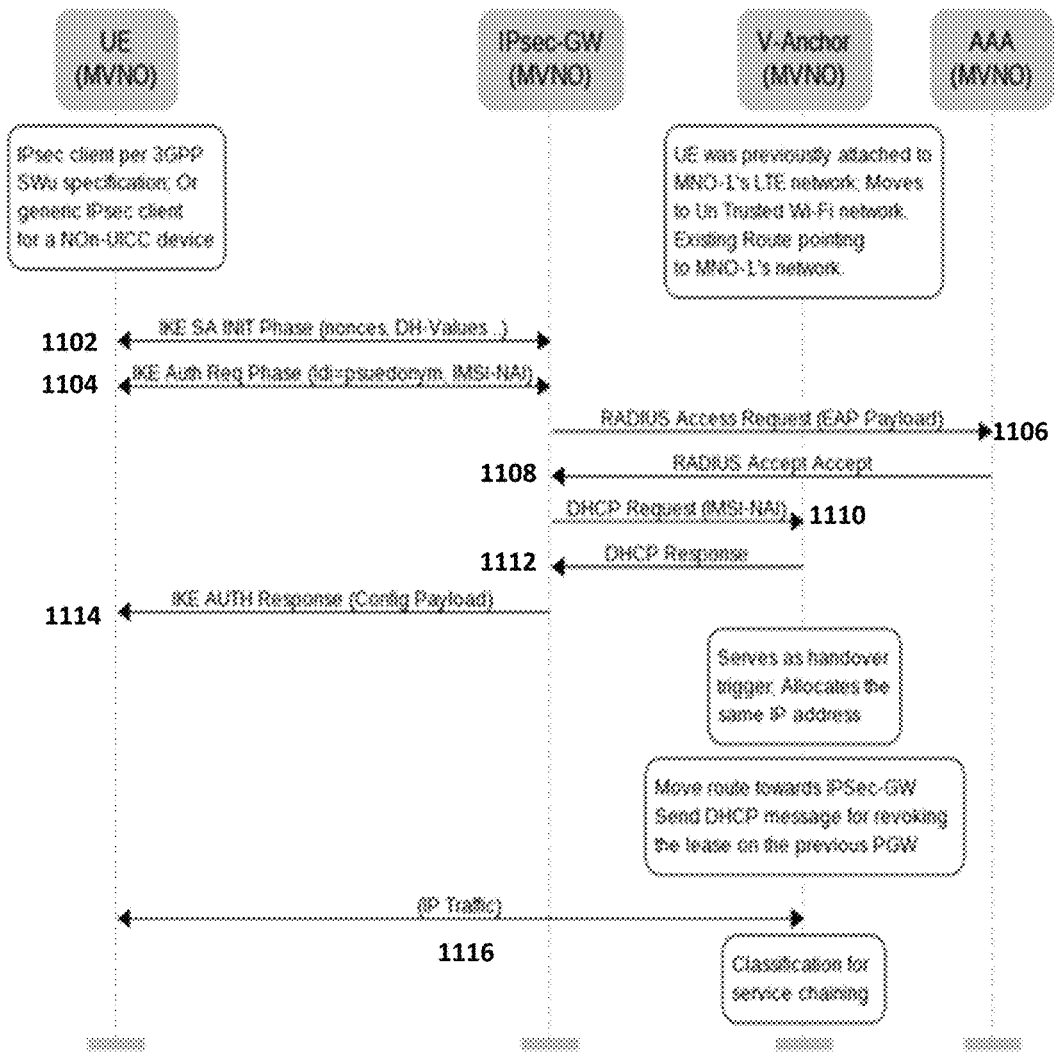
FIG. 11 is a process flow diagram for facilitating roaming between a cellular network and an untrusted wireless local area network in accordance with embodiments of the present disclosure.

FIG. 11 is a process flow diagram 1100 for facilitating roaming between a cellular network and an untrusted wireless local area network in accordance with embodiments of the present disclosure. At the outset, the UE is attached to a first MNO network, which can be an LTE network. The existing IP routing is pointing to the first MNO network. The UE moves to an untrusted Wi-Fi network.

The UE can include an IPsec client. The UE can attempt to set up a secure association with the IPsec Gateway (IPsec GW) (1102). The UE can use the Internet Key Exchange protocol to engage in dialog with the IPsec GW to initialize the secure associate with the IPsec GW. The IPsec GW can authorize the UE to establish the secure association (1104). The IPsec GW can send an EAP message to the AAA server as access request (1106). The AAA server can provide an access request acceptance message to the IPsec GW (1108). The IPsec GW can send a DHCP request message to the virtual mobility anchor (1110). The DHCP request message can serve as a trigger for the handover from the first MNO network to the untrusted WLAN. The virtual mobility anchor can reassign the IP address for the current IP session with the IPsec GW. The IP address that is reassigned is the same IP address used for the UE's IP session with the first MNO network's PGW. The virtual mobility anchor can send a DHCP response message to the IPsec GW that includes the IP address configuration information (1112). The IPsec GW can send an authorization response message to the UE (1114) to establish the association with the IPsec GW.

The virtual mobility anchor can route IP traffic to and from the UE (1116). The virtual mobility anchor can also send a DHCP message to the PGW of the first MNO instructing the release of the IP address, which will now be used in the IP session with the IPsec GW. Additionally, by routing IP traffic through the virtual mobility anchor, the virtual mobility anchor can facilitate service function augmentation of IP packets and classification of IP packets for other reasons, such as accounting and targeted advertising.

Any of these elements (e.g., the network elements, service nodes, etc.) can include memory elements for storing information to be used in achieving the above features, as outlined herein. Additionally, each of these devices may include a processor that can execute software or an algorithm to perform the NSH-related features as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of using a virtual mobility anchor to allow a user equipment to connect to one of a plurality of cellular or other wireless networks, as potentially applied to a myriad of other architectures.

It is also important to note that the various steps described herein illustrate only some of the possible scenarios that may be executed by, or within, the nodes with NSH capabilities described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by nodes with a virtual mobility anchor in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

LIST OF ABBREVIATIONS

3GPP 3rd Generation Partnership Project
AAA Authentication, Authorization, and Accounting
AIA Authentication Information Answer
AIR Authentication Information Request
APN Access Point Name
BNG Broadcast Network Gateway
DHCP Dynamic Host Configuration Protocol
DNS Domain Name System
eNB Evolved Node B
E-RAB E-UTRAN Radio Access Bearer
E-UTRAN Evolved Universal Terrestrial Radio Access Network HSS Home Subscriber Server
IMSI International Mobile Subscriber Identity
IPX Internetwork Packet Exchange
LBO Local Breakout
LTE Long Term Evolution
MCC Mobile Country Code
MME Mobility Management Entity
MNC Mobile Network Code
MNO Mobile Network Operator
MSISDN Mobile Station International Subscriber Directory Number
MVNO Mobile Virtual Network Operator
NAI Network Access Identifier
NAS Non-Access Stratum
OTT Over the Top
PCRF Policy Control and Charging Rules Function
PGW Packet Gateway
PLMN Public Land Mobile Network
QoS Quality of Service
RAN Radio Access Network
RRC Radio Resource Control
SGW Serving Gateway
UE User Equipment
ULR Update Location Request
VMAN Virtual Mobility Anchor Node
VRF Virtual Routing and Forwarding
WAG Wireless Access Gateway

We claim:

1. A virtual mobility anchor network element comprising:
a network interface implemented at least partially in hardware; and
a processor implemented at least partially in hardware;
wherein the virtual mobility anchor network element is communicatively coupled to a plurality of packet gateway (PGW) nodes relating to a plurality of mobile network operators (MNO) and is configured to:
allocate a first internet protocol (IP) address for a mobile device;
route IP traffic to the mobile device using a first PGW node, of the plurality of PGW nodes, associated with a first MNO, of the plurality of MNOs; and
receive an IP address allocation request for the mobile device relating to a second MNO of the plurality of MNOs, and in response trigger a handover of the mobile device from the first MNO to the second MNO, the handover comprising:
modifying routing for the mobile device from the first PGW node to a second PGW node associated with the second MNO, wherein after handover the virtual mobility anchor network element is configured to route IP traffic to the mobile device using the second PGW node.

2. The virtual mobility anchor network element of claim 1, wherein at least one of the requests for an IP address comprises a Dynamic Host Configuration Protocol (DHCP) request message from a PGW node of the plurality of PGW nodes.

3. The virtual mobility anchor network element of claim 2, wherein the DHCP request for an IP address received from the PGW node comprises one or both of an International Mobile Subscriber Identity (IMSI) or a Network Access Identifier (NAI).

4. The virtual mobility anchor network element of claim 1, wherein the virtual mobility anchor network element is further configured to:
receive IP traffic from a network location;
determine a target destination for the IP traffic based on a destination IP address of the mobile device;
identify a PGW node associated with the destination IP address, based on the IP address; and
forward the IP traffic to the PGW node.

5. The virtual mobility anchor network element of claim 1, wherein the virtual mobility anchor network element is configured to instruct the first PGW node to forget and release the IP address and to discontinue routing IP traffic to the virtual mobility anchor network element.

6. The virtual mobility anchor network element of claim 1, wherein the virtual mobility anchor network element is configured to:
receive IP traffic from a network location;
determine a target destination for the IP traffic based on a destination IP address, the destination IP address comprising a second IP address; and
forward the IP traffic to the second PGW node associated with the destination IP address.

7. The virtual mobility anchor network element of claim 1, wherein the virtual mobility anchor network element is further configured to:
receive IP traffic from the second PGW node;
determine a target destination for the IP traffic; and
route the IP traffic to the target destination.

8. The virtual mobility anchor network element of claim 1, wherein the handover further comprises:
allocating the first IP address to the mobile device for the second MNO.

9. The virtual mobility anchor network element of claim 8, wherein the handover further comprises transmitting a network message to the first PGW node requesting release of the first IP address.

10. A method performed by a virtual mobility anchor network element implemented at least partially in hardware and communicatively coupled to a plurality of packet gateway (PGW) nodes relating to a plurality of mobile network operators (MNO), the method comprising:
allocating a first internet protocol (IP) address for a mobile device;
routing IP traffic to the mobile device using a first PGW node, of the plurality of PGW nodes, associated with a first MNO, of the plurality of MNOs; and
receiving an IP address allocation request for the mobile device relating to a second MNO of the plurality of MNOs, and in response triggering a handover of the mobile device from the first MNO to the second MNO, the handover comprising:
modifying routing for the mobile device from the first PGW node to a second PGW node associated with the second MNO, wherein after handover the virtual mobility anchor network element is configured to route IP traffic to the mobile device using the second PGW node.

11. The method of claim 10, wherein at least one of the requests for the IP address comprises a Dynamic Host Configuration Protocol (DHCP) request.

12. The method of claim 10, wherein at least one of the requests for the IP address received from the PGW nodes comprises one or both of an International Mobile Subscriber Identity (IMSI) or a Network Access Identifier (NAI).

13. The method of claim 10, further comprising:
receiving IP traffic from a network location;
determining a target destination for the IP traffic based on a destination IP address;

identifying a PGW node associated with the destination IP address, based on the IP address; and forwarding the IP traffic to the PGW node.

14. The method of claim 10, further comprising instructing the first PGW node to forget the IP address and to discontinue routing IP traffic to the virtual mobility anchor network element.

15. The method of claim 10, further comprising:

receiving IP traffic from a network location;

determining a target destination for the IP traffic based on a destination IP address, the destination IP address comprising a second IP address; and forwarding the IP traffic to the second PGW node associated with the destination IP address.

16. The method of claim 10, further comprising:

receiving IP traffic from the second PGW node;

determining a target destination for the IP traffic; and routing the IP traffic to the target destination.

17. The method of claim 10, wherein the handover further comprises:

allocating the first IP address to the mobile device for the second MNO.

18. A mobile virtual network comprising:

a home subscriber server (HSS) implemented at least partially in hardware, the HSS comprising a database of subscribers and, for each subscriber, information about authorized cellular networks each subscriber is authorized to connect to, the HSS configured to:

receive a request for authentication of a user equipment (UE) to connect to a cellular network from a mobility management entity associated with the cellular network; and determine that the UE is authorized to connect to the cellular network; and a virtual mobility anchor network element implemented at least partially in hardware, wherein the virtual mobility anchor network element is communicatively coupled to a plurality of Internet gateway nodes relating to a plurality of cellular networks and is configured to:

allocate a first Internet Protocol (IP) address for the UE;

route IP traffic to the UE using a first Internet gateway node, of the plurality of Internet gateway nodes, associated with a first cellular network, of the plurality of cellular networks; and receive an IP address allocation request for the UE relating to a second cellular network of the plurality of cellular networks, and in response trigger a handover of the UE from the first cellular network to the second cellular network, the handover comprising:

modifying routing for the UE from the first Internet gateway node to a second Internet gateway node associated with the second cellular network, wherein after handover the virtual mobility anchor network element is configured to route IP traffic to the UE using the second Internet gateway node.

19. The mobile virtual network of claim 18, wherein the HSS is configured to receive location update information about a location of the UE.

20. The mobile virtual network of claim 18, wherein the HSS is configured to:

determine that the UE is authorized to access the plurality of cellular networks in a location;

determine a preferred cellular network from the plurality of cellular networks; and authenticate the UE to connect to the preferred cellular network.

21. The mobile virtual network of claim 20, wherein the HSS determines the preferred cellular network based on one or more of a quality of service of the preferred cellular network, subscription parameters for the UE, or pricing.

22. The mobile virtual network of claim 18, wherein the plurality of cellular networks comprises a plurality of cellular networks associated with different mobile network operators.

23. The method of claim 17, wherein the handover further comprises transmitting a network message to the first PGW node requesting release of the first IP address.

* * * * *